(12) United States Patent
Jang et al.

(10) Patent No.: US 12,303,834 B2
(45) Date of Patent: May 20, 2025

(54) SOLAR-THERMAL MEMBRANE FOR DEWATERING AQUEOUS ORGANIC-ACID SOLUTIONS

(71) Applicant: UT-Battelle, LLC, Oak Ridge, TN (US)

(72) Inventors: Gyoung Gug Jang, Oak Ridge, TN (US); Michael Z. Hu, Oak Ridge, TN (US); Constantinos Tsouris, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 70 days.

(21) Appl. No.: 17/545,104

(22) Filed: Dec. 8, 2021

(65) Prior Publication Data

US 2022/0184557 A1    Jun. 16, 2022

Related U.S. Application Data

(60) Provisional application No. 63/123,522, filed on Dec. 10, 2020.

(51) Int. Cl.
*B01D 61/36*   (2006.01)
*B01D 63/06*   (2006.01)
(Continued)

(52) U.S. Cl.
CPC ......... *B01D 61/363* (2022.08); *B01D 61/362* (2013.01); *B01D 63/06* (2013.01); *B01D 67/0079* (2013.01); *B01D 67/00931* (2022.08); *B01D 69/02* (2013.01); *B01D 69/108* (2022.08); *B01D 69/148* (2013.01); *B01D 71/0211* (2022.08); *C02F 1/14* (2013.01); *C02F 1/448* (2013.01); *B01D 2323/04* (2013.01);
(Continued)

(58) Field of Classification Search
None
See application file for complete search history.

(56) References Cited

U.S. PATENT DOCUMENTS 7,852,612 B2 * 12/2010 Zhao ...................... H01G 11/36
                                                              252/502
2016/0354729 A1 * 12/2016 Krishna ............... B01D 61/027

OTHER PUBLICATIONS

Wu Z, Xi X, Lei H, Du G. Soy-Based Adhesive Cross-Linked by Phenol-Formaldehyde-Glutaraldehyde. Polymers (Basel). May 8, 2017;9(5):169. (Year: 2017).*

(Continued)

*Primary Examiner* — Magali P Slawski
*Assistant Examiner* — Eric J McCullough
(74) *Attorney, Agent, or Firm* — WARNER NORCROSS + JUDD LLP

(57) ABSTRACT

A solar-thermal vapor-permeation membrane is provided. The solar-thermal vapor-permeation membrane includes a thermally conductive, microporous support layer having a feed surface, and an active separation layer adjacent the feed surface of the support layer. The support layer is capable of absorbing solar-thermal radiation. Utilization of solar energy for a membrane separation process replaces fossil-fuel derived energy with renewable energy as the driving force and does not involve the generation of undesirable greenhouse gas emissions. Therefore, the solar-thermal vapor-permeation process using the provided membrane is cost effective, energy efficient, and environmentally friendly.

16 Claims, 3 Drawing Sheets

(51) Int. Cl.
  *B01D 67/00* (2006.01)
  *B01D 69/02* (2006.01)
  *B01D 69/10* (2006.01)
  *B01D 69/14* (2006.01)
  *B01D 71/02* (2006.01)
  *C02F 1/14* (2023.01)
  *C02F 1/44* (2023.01)
  *C02F 101/34* (2006.01)

(52) U.S. Cl.
  CPC ...... *B01D 2323/30* (2013.01); *B01D 2325/38* (2013.01); *C02F 2101/34* (2013.01); *C02F 2201/009* (2013.01)

(56) References Cited

OTHER PUBLICATIONS

Jang, G. G., Klett, J. W., McFarlane, J., Ievlev, A., Xiao, K., Keum, J. K., Yoon, M., Im, P., Hu, M. Z., Parks, J. E., Efficient Solar-Thermal Distillation Desalination Device by Light Absorptive Carbon Composite Porous Foam. Global Challenges 2019, 3, 1900003. (Year: 2019).*

Cheng X, Cai W, Chen X, Shi Z, Li J. Preparation of graphene oxide/poly(vinyl alcohol) composite membrane and pervaporation performance for ethanol dehydration. RSC Adv. May 17, 2019;9(27):15457-15465. (Year: 2019).*

* cited by examiner

SOLAR-THERMAL MEMBRANE FOR DEWATERING AQUEOUS ORGANIC-ACID SOLUTIONS

CROSS-REFERENCE TO RELATED APPLICATIONS

This application claims the benefit of U.S. Provisional Application 63/123,522, filed Dec. 10, 2020, the disclosure of which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to vapor-permeation membranes for separating liquid solutions of water and another molecular component.

BACKGROUND OF THE INVENTION

Typically, energy is consumed during molecular separations to provide the necessary driving force (e.g., thermal, electrical, mechanical, etc.) to separate one type of molecule from another. Therefore, the energy efficiency of separation processes is important. Membrane separations belong to a category of less-energy-intensive technologies in comparison to traditional thermal distillation. Membrane pervaporation, for example, is a membrane separation process in which a liquid-impermeable membrane layer is used to separate a liquid solution. Despite being more energy efficient than traditional distillation processes, membrane pervaporation still requires the liquid feed solution to be heated to an elevated temperature, typically in the range of 25 to 100° C. Even higher temperatures are preferred to allow for higher permeation flux. Thus, membrane pervaporation of liquid solutions consumes significant amounts of energy, and as a result, energy requirements may compromise the process economics.

One ubiquitous application of separation processes involves the separation of water from other molecules. The amount of energy consumed in the separation of water from other molecular components is a significant consideration as it relates to both the consumption of resources for energy production and the byproducts of this production of energy. Therefore, energy efficient processes for separating water from liquid solutions are increasingly in demand. Use of solar energy for membrane separations of aqueous solutions may provide a more cost-effective and energy-efficient process that does not involve the emission of greenhouse gases, thereby conserving resources and reducing environmental impact.

SUMMARY OF THE INVENTION

A solar-thermal vapor-permeation membrane and method for separating the components of a liquid solution, such as solutions of organic acids in water, is provided. The solar-thermal vapor-permeation membrane includes a thermally conductive, porous support layer having a feed surface, and an active separation layer adjacent the feed surface of the support layer. The support layer is capable of absorbing solar-thermal radiation. The method includes providing a system including a structure formed of the solar-thermal vapor-permeation membrane. A feed solution including water and an organic component is introduced to the system, and the system is subjected to solar-thermal radiation. A water vapor permeate component of the solution released through the vapor-permeation membrane structure is collected, whereby a concentration of the organic component of the feed solution is increased. The concentrated organic component is then obtained from the system.

In the solar-thermal vapor-permeation membrane, the solar heating mechanism, with a high solar-to-heat conversion efficiency is intimately coupled with the membrane vaporization/separation mechanism in a single unit operation, so that the liquid feed is directly heated by the membrane using solar energy and does not need to be heated prior to introducing the feed to the membrane. Solar membrane dewatering is therefore a renewable-energy driven process that can be used to concentrate molecular components such as organic acids in water prior to applying a more energy-intensive method, such as distillation, to complete the separation of the acids from water. Utilization of solar energy for a membrane separation process replaces fossil-fuel derived energy with renewable energy as the driving force and does not involve the generation of undesirable greenhouse gas emissions. Therefore, the solar-thermal vapor-permeation process is cost effective, energy efficient, and environmentally friendly.

These and other features of the invention will be more fully understood and appreciated by reference to the description of the embodiments and the drawings.

DETAILED DESCRIPTION OF THE CURRENT EMBODIMENTS

Figure 1:
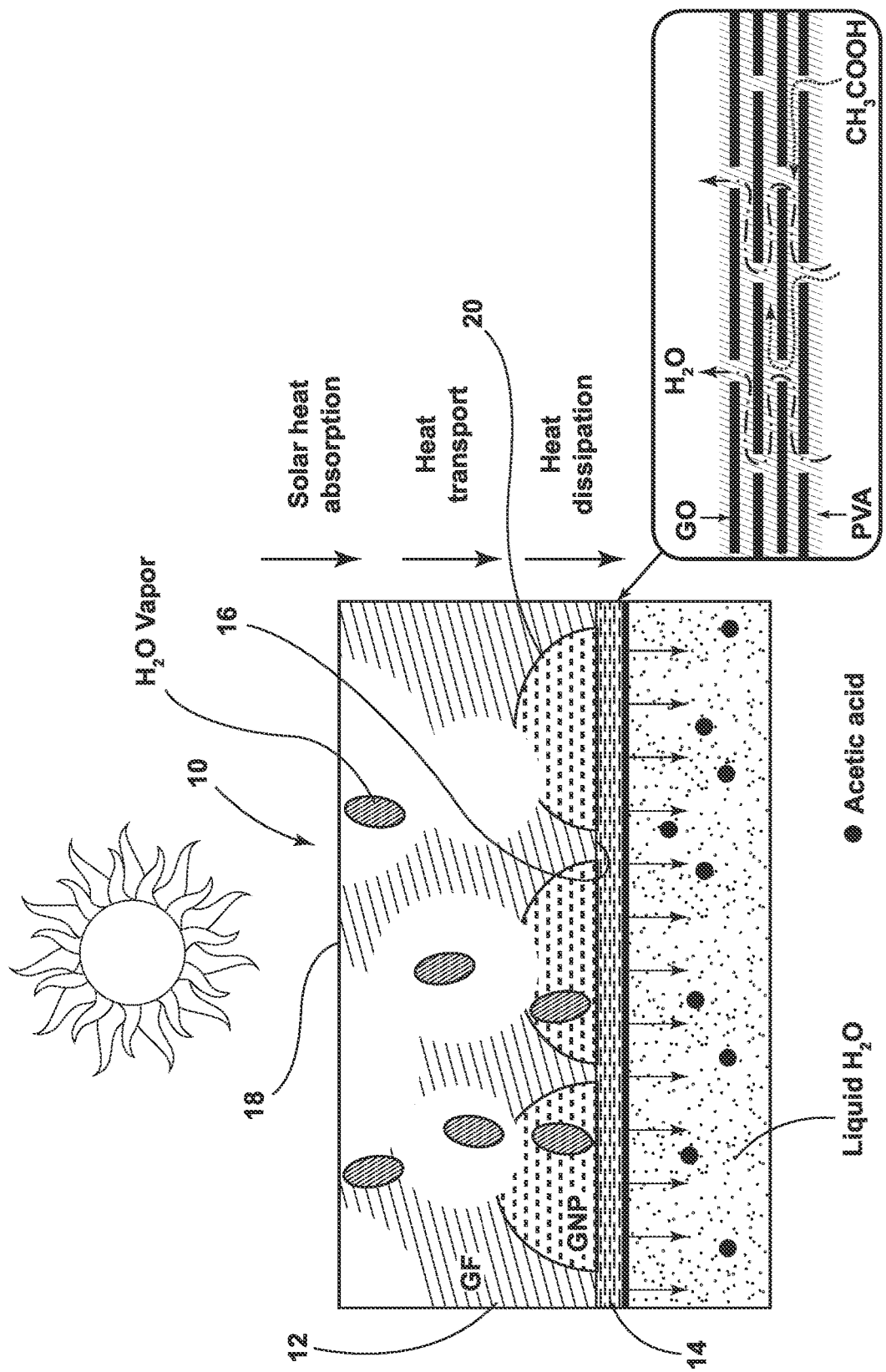
FIG. 1 is a schematic view of a solar-thermal vapor-permeation membrane in accordance with some embodiments of the disclosure.

As discussed herein, the current embodiments relate to a solar-thermal vapor-permeation membrane, a method of fabricating the membrane, and a method of separating an organic component from an aqueous mixture using the membrane. The solar-thermal vapor-permeation membrane absorbs solar energy to conduct heat and evaporate liquid water directly at the interface between the membrane and the bulk aqueous feed solution. As generally illustrated in FIG. 1, the solar-thermal vapor-permeation membrane 10 includes a thermally conductive, porous support layer 12 that is capable of absorbing solar-thermal radiation, and an active separation layer 14 adjacent a feed surface 16 of the support layer.

In some embodiments, the porous support layer 12 may be formed of a black, thermally conductive graphite foam as an effective photothermal-energy absorber and heat conductor. Alternatively, the support layer may be formed of a metal foam such as nickel foam, titanium foam, or aluminum foam. In yet another alternative, the support layer may be formed of a stainless-steel filter. The support layer may be microporous, generally having a pore size of less than 2 nm, or may be macroporous, generally having a pore size of greater than 50 nm, or may be mesoporous, generally having a pore size between 2 and 50 nm, or may be a combination of microporous, mesoporous, and microporous. The feed surface 16 of the support layer 12 is disposed on the side of the membrane 10 at which a feed liquid is contacted with the membrane and at which vapor generated in the feed liquid passes into the support layer. The support layer 12 has an opposite outer side 18 through which the vapor exits from the membrane 10 into the environment external to the membrane. The support layer may, for example, have a thickness of greater than 0.5 cm, a pore size in the range of approximately 100-300 μm, and a porosity (as a % void fraction) of approximately 80%.

The active separation layer 14 may be formed of graphite nanoparticles (GNP) coated on the feed surface 16 of the support layer 12. Alternatively, the active separation layer may be formed of a polymer-inorganic hybrid composite such as a polyvinyl alcohol, graphene oxide/polyvinyl alcohol (GO/PVA), a polyimide, an amorphous perfluoro polymer, NaA zeolites, chabazite zeolites, T-type zeolites, or hybrid silicas. An intermediate layer 20 may be disposed between the feed surface 16 of the support layer 12 and the active separation layer 14, such that the active separation layer is not directly adjacent to the support layer is near to and in close proximity to the feed surface, separated only by the intermediate layer. The intermediate layer may be formed of one or both of graphite nanoparticles (GNP) and carbon microbeads (CM). In certain embodiments, the intermediate layer may be formed of a first sublayer formed of carbon microbeads having a thickness of approximately 200 μm, a pore size of approximately 5 μm, and a porosity of approximately 10-20%, and a second sublayer formed of graphite nanoparticles having a thickness in the range of approximately 5-10 μm, a pore size of approximately 0.5 μm, and a porosity of approximately 5-10%. Further, in these embodiments, the active separation layer may be formed of a graphene oxide/polyvinyl alcohol composite having a thickness of approximately 0.200 μm, and a negligible pore-size (i.e., microporous) and negilible porosity (i.e., dense porosity).

An outer surface of the active separation layer 14 opposite the feed surface 16 of the support layer 12 may be modified with a hydrophobic ligand to form a superhydrophobic functional layer. In certain embodiments, the active separation layer is modified with a perfluoro-silane such as 1H,1H, 2H,2H-perfluorodecyltrimethoxy-silane (PDTMS) to form a functional layer on the outer surface of the active layer having a thickness of less than 0.001 μm, and a negligible pore-size (i.e., microporous) and porosity (i.e., dense porosity). Alternatively, the hydrophobic ligand may be a fatty acid or alkyl thiol. The chemically modified, hydrophobic feed-side surface of the membrane may have a water-droplet contact angle of >120°. Thus, the membrane can further block the liquid feed solution, allowing only vapor, generated via photothermal vapor-permeation, to permeate.

The layers of an exemplary solar-thermal vapor-permeation membrane are shown in Table 1 below.

TABLE 1

Solar-Thermal Vapor-Permeation Membrane

| Layer | Material | Layer thickness (μm) | Pore-size | Porosity (% void fraction) | Coating solution |
|---|---|---|---|---|---|
| Functional layer | Perfluorosilane | <0.001 μm | Dense | — | 5% perfluorsilane (1H,2H,2H-perfluorodecyltrimethoxy-silane) in hexane |
| Separation layer | Graphene oxide(GO)/PVA | 0.200 μm | Dense | — | GO based solution: 0.025 wt % GO in PVA/DI water. *Binder: Polyvinyl alcohol, PVA (e.g., weight ratio of GO/PVA = 2, 1, 0.5) |
| Intermediate layer | Graphite Nanoparticle (GNP: grade 4827, 225-275 m²/g, Asbury Graphite Mills Inc) | 5~10 μm | 0.5 μm | 5-10% | 10% GNP slurry in binder/ethanol. The slurry (i.e., GNP:Binder:ethanol = 1:2:7) (*Binder = Phenolic resin binder, Durite SC1008) |
|  | Carbon Microbead (CM), EQ-Lib-MCMB MCMC (MesoCarbon MicroBeads)Graphite powder for Li-ion Battery Anode, MTI CORP) | 200 μm | 5 μm | 10-20% | 25% CM slurry in binder/ethanol solution Weight ratio: CM:Binder:ethanol = 1:1:2 (*Binder = Phenolic resin binder, Durite SC1008) |
| Support | Graphite foam | >0.5 cm | 100-200 μm (200-300 μm, cell size) | ~80% | Thermally conductive graphite foam (bulk thermal conductivity of >150 Wm$^{-1}$K$^{-1}$) |

Figure 2:
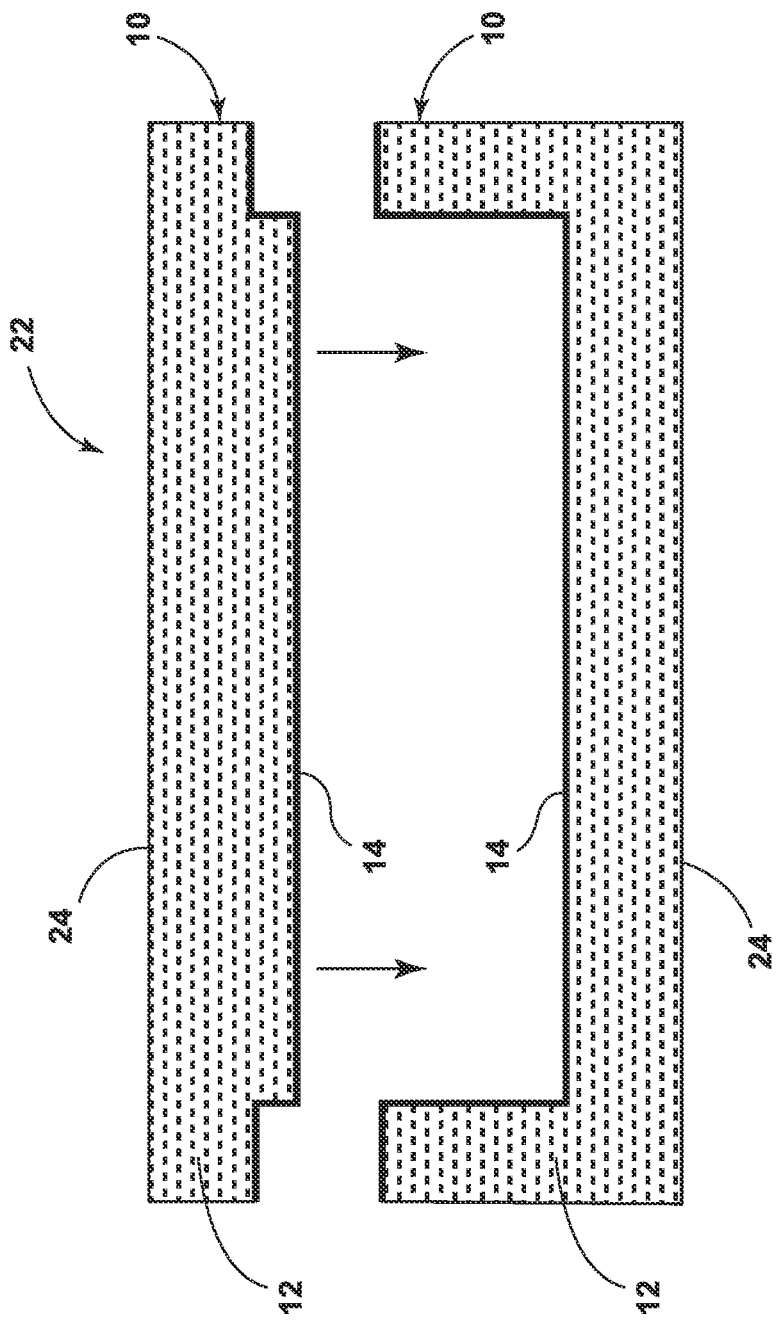
FIG. 2 is a schematic, sectional view of a cell fabricated from the solar-thermal vapor-permeation membrane.
Figure 3:
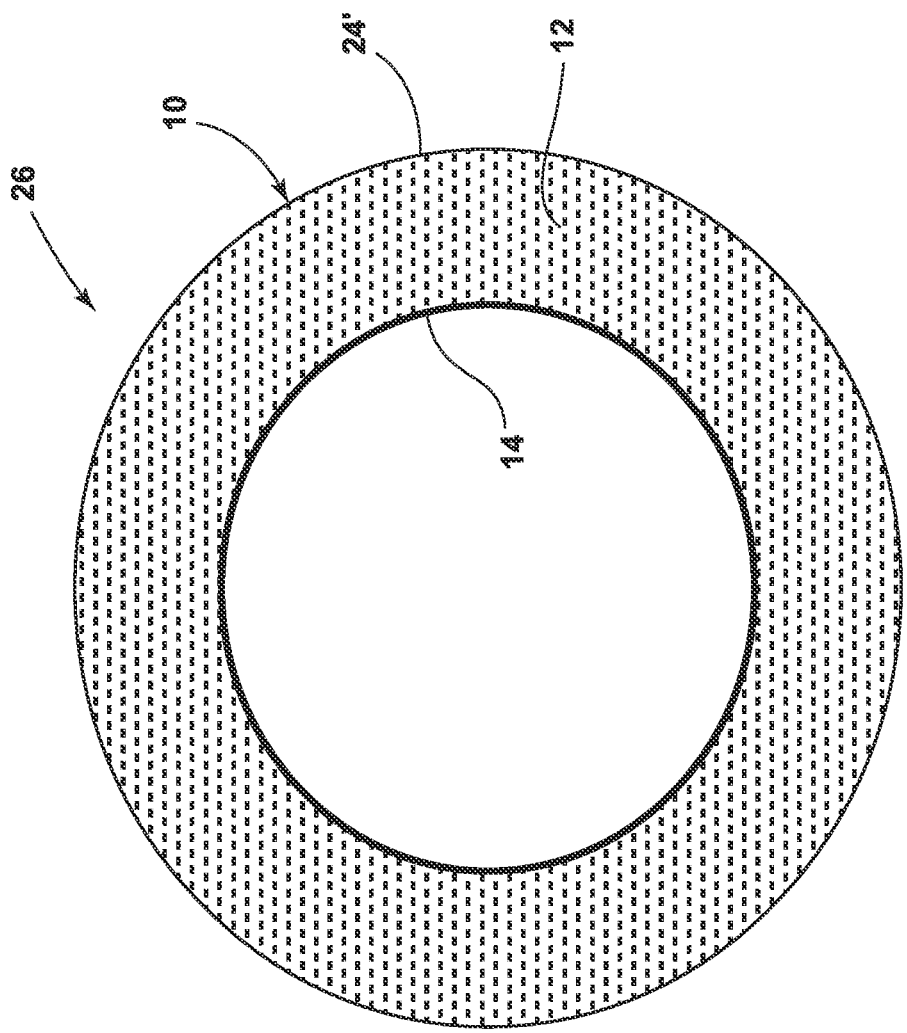
FIG. 3 is a schematic, sectional view of a tube fabricated from the solar-thermal vapor-permeation membrane.

As shown in FIG. 2, in some embodiments a vapor-permeation system may be in the form of a closed (and selectively openable) cell 22 fabricated from the solar-thermal vapor-permeation membrane 10. For example, the cell 22 may include a cup and a removable lid. The support layer 12 forms an outer surface 24 of the cell 22 that is exposed to the environment outside of the cell and which is opposite the feed surface of the support layer. The active separation layer 14 faces the inside of the cell and comes into contact with feed liquid that is introduced into the cell. The externally facing support layer absorbs solar radiation and generates heat which is absorbed into the cell to drive the separation process at the active separation layer. In other embodiments shown in FIG. 3, the vapor-permeation system may be in the form of a tube 26 fabricated from the solar-thermal vapor-permeation membrane 10. The support layer 12 forms an outer surface 24' of the tube 26 having the same properties as the outer surface of the cell. The active separation layer 14 surrounds the inside diameter of the tube and faces the inner passageway formed by the tube, via which the active separation layer comes into contact with feed liquid communicated through the tube in a continuous flow-through separation process.

A method of separating a molecular component from a liquid, such as separating an organic component from water, first includes providing a system having a structure formed of the solar-thermal vapor-permeation membrane. The structure may be a cell or tube as described above, or simply may be a barrier such as a wall of a cell or the wall of a tube that forms a barrier preventing the flow of liquid therethrough. The feed liquid may be an aqueous solution of an organic acid such as acetic acid. Acetic acid is a major product (e.g., up to ~10%), for example, in aqueous fractions of fast pyrolysis or catalytic fast pyrolysis processes. Selective separation of water from acetic acid is a challenging problem because acetic acid is very soluble in water. However, water can be separated and removed from acetic acid using the solar-thermal vapor-permeation membrane. The feed solution is next introduced into the system, such as, for example, the closed cell 22 or feed tube 26. As shown schematically in FIG. 1, the system is subjected to solar-thermal radiation, which is absorbed by the support layer 12 to generate heat, which in turn is transferred to the interface of the active separation layer 14 and the feed liquid. The heat warms the feed liquid and vaporizes water molecules at the active separation layer, creating a cross-membrane pressure gradient between the feed side and the outer (permeate) side. Liquid cannot pass through the active separation layer, but gaseous water vapor may permeate through the active separation layer and be released out the support layer to the environment outside the cell. By design, the surfaces of the membrane are super-hydrophobic or densely coated to prevent the water liquid from penetrating into the membrane pores, while allowing the water vapor to permeate across the membrane from the feed side to the permeate side due to the pressure gradient. The different diffusivity of components (i.e., water and acetic acid) through the membrane causes the separation of water molecules from acetic acid molecules. The water vapor permeate component of the solution released from the cell through the membrane may be condensed and collected. Continuous removal of the released vapor from the membrane permeation site keeps a concentration gradient across the membrane, which acts as a driving force for the process. The concentration of the acetic acid component in the feed solution is thereby increased, and the concentrated acetic acid can be obtained from inside the cell.

The organic component of the aqueous solution forming the feed liquid may alternatively be, but is not limited to, ethanol, propanol, isopropanol, butanol, ethyl acetate, isobutyl acetate, ethyl butyrate, toluene, or ethyl oleate. Additional driving forces for the separation process such as a vacuum and gas purging are not necessary due to the constant supply of heat provided by solar radiation. However, a vacuum source optionally may be incorporated on the outside of the system, in which case the separation process across the membrane shifts from vapor-permeation to pervaporation. The end result in either case is the same, i.e. water is removed from the feed liquid.

EXAMPLES

The present solar-thermal vapor-permeation membrane and method of separating an organic component from an aqueous solution is further described in connection with the following laboratory examples, which are intended to be non-limiting.

One solar-thermal vapor-permeation membrane fabricated in accordance with the disclosure is a graphite-nanoparticle (GNP)/foam-based porous membrane. A thermally conductive porous graphite foam (GF, CFOAM LLC) was provided as a support. The thermally conductive GF has 80% porosity. Graphitic nano-powders (GNP grade 4827, 225-275 $m^2$/g, Asbury Graphite Mills Inc.) were mixed with a phenolic resin binder (Durite SC1008). A nanoparticle slurry (~10 wt. % in resin/ethanol mixture) including the graphite nanoparticles and binder was deposited on the graphite foam support using knife coating to fill the open cells and pores of the top surface of the foam. After manual deposition of the top-layer of graphite nanoparticle powders, the coated foam was annealed in a furnace at 300° C. for 1 hour. The deposited surface layer was modified with the hydrophobic ligand 1H,1H,2H,2H-perfluorodecyltrimethoxy-silane (PDTMS, Synquest Laboratories) to form a superhydrophobic surface. The heat-treated surface of the coated membrane side was further soaked with 2 vol. % of PDTMS-hexane solution for 16 hours at room temperature and then dried in an oven at 80° C. for 2 hours. After this treatment, the total reflectance of the outer shell surface was 0.068, and the light absorption was 93.2%.

Another solar-thermal vapor-permeation membrane fabricated in accordance with the disclosure is a graphene oxide (GO) film/foam-based dense membrane. To obtain a refined GO-PVA coating on a GNP-coated foam the following procedure was applied. A 4 mg/ml (~0.4 wt. %) of GO stock solution (Graphenea, Monolayer content>95%, dispersed in water, C=49-56%, H=0.1%, S=2-4%, O=41-50%) was prepared. The 0.4 wt. % of "stock GO solution" was diluted to 0.1 wt. % of GO. The GO solution, 0.25 wt. % aqueous PVA ($M_w$~67,000, Sigma-Aldrich, St. Louis, MO) binder solution, and additional water were mixed to prepare various ratios of GO and PVA aqueous solutions (e.g., GO=0.025 wt. % with GO/PVA=2, 1, 0.5). Then, a GNP/phenolic resin solution (see above) was deposited on a graphite foam substrate to reduce the pore size from 200 μm for the open cell to 0.5 μm for the GNP layer. A 200 μl of the GO/PVA coating solution was drop-casted onto the 1 $cm^2$ area of GNP-coated substrate and dried overnight. The GO/PVA-coated foam was submerged in a crosslinking solution containing 5 vol. % aqueous solution of glutaraldehyde for 2.5 hours at 60° C. After the PVA-glutaraldehyde crosslinking, the GO/PVA/glutaraldehyde-membrane-deposited foam was washed with copious water and dried overnight. The hydrophilic membrane surface was further modified with hydrophobic PDTMS ligands as described above.

Graphite foam (GF) solar-thermal vapor-permeation membrane cells comprising a cup with a lid measuring 5 mm thick and 12 mm deep with a 60 mm inner diameter and 70 mm outer diameter were used to evaluate the solar-thermal vapor-permeation process. The feed-side solution, acetic acid of ~12 wt. %, was heated by the membrane, while a solar-lamp light was shone on the GF support of the GO-PVA membrane on the permeate side. Solar-thermal irradiation was simulated by a 2700 K incandescent heat lamp with varying light intensity and strong infrared generation. The concentrated solar intensity ranged from 0.7 to 3 sun intensity and was calibrated by the distance between the midpoint of lowest surface of the lamp and the top surface of the cup. One sun is equal to 100 mW/cm² of irradiance. Depending on location, time, and season, the actual sunlight varies from 0.2-0.8 sun. However, the concentrated solar power can increase up to 1000 suns onto a small receiver. The GF membrane is a highly efficient solar heat absorber and conductor. The temperature of the top surface increased to 92.2° C. within 10 min at ~1.4 suns, corresponding to ~93% of light absorption. The temperature at the membrane on the inside of the chamber was identical to that of the top surface. The high rate of heat transfer is associated with a high bulk thermal conductivity of greater than 150 $Wm^{-1}K^{-1}$. As the simulated solar intensity increased, the temperature of the membrane also increased. The effective permeation flux was measured by the weight loss of the GF cup through the light-exposed membrane area (i.e., 28.3 cm² for the 6-cm inner diameter of the cup) at steady-state evaporation (i.e., 30-60 min) during 1-hr solar irradiation at open-air conditions. For permeation analysis, a transparent glass chamber was capped on the GF cup and the permeated vapor was observed to condense inside the glass chamber during irradiation. Due to the cold bottom (5-10° C.) underneath the bottom glass chamber, the permeate vapor was condensed and trapped in the bottom of the glass chamber. The condensate was collected and further analyzed to determine the concentration of acetic acid.

The pervaporation performance was mainly measured by the permeate flux J and separation factor SF, which are defined as $$J = m/(A \times t) \quad (1)$$

and $$SF = (Y_A/Y_B)/(X_A/X_B) \quad (2)$$

where J is the total flux in kg m⁻² h⁻¹, m is the mass of permeating mixture in kg of water, A is the membrane surface area (m²), and t is the collection time (h). $Y_A$ and $Y_B$ are the concentrations (wt. %) of water and acetic acid in the permeate, respectively; $X_A$ and $X_B$ are the concentrations (wt. %) of water and acetic acid in the feed solution, respectively; and subscripts A and B represent water and acetic acid, respectively.

Table 2 shows three modes of separation tests and results obtained with the foam cup system: (1) solar open distillation; (2) solar thermal membrane distillation; and (3) solar thermal membrane vapor-permeation. In the solar-thermal open distillation mode with an open cup, the black GNP layer under the acetic acid-water solution absorbed solar energy to heat up the solution and produce vapor. Separation of acetic acid and water was achieved by the different boiling points of acetic acid and water. For the solar thermal membrane distillation mode, a black porous graphite foam outer shell absorbed solar energy. Heat was transferred to the solution inside the membrane cup chamber and produced vapor-permeation. The microporous structure in the skin layer of the GNP membrane allowed the vapor to permeate the membrane and trap the bulk acetic acid liquid solution. In the solar-thermal vapor-permeation mode, the dense hydrophilic/hydrophobic GO/PVA membrane acted as a key molecular separation layer for the acetic-acid/water vapor.

The data in Table 2 shows that, in general, the permeation flux of all three modes investigated increased with solar thermal intensity due to a higher thermal gradient. At higher temperatures, the vapor pressure of permeating molecules and the free volume of polymeric chains also increased. Compared with the separation factors for solar thermal distillation and solar thermal membrane distillation shown in Table 1, the solar thermal membrane vapor-permeation mode with either a hydrophobic or hydrophilic membrane performed much better in terms of permselectivity due to the dense GO/PVA layer.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of

TABLE 2

Trial Separation Results

| | Active layer | Pore-size/ Thickness | Solar-thermal Intensity | Open to air Avg. Temp. (30-60 min) | Condensation Avg. Temp (30-60 min) | Effective Flux (kg/m²/hr) | Separation factor |
|---|---|---|---|---|---|---|---|
| Open Distillation | N/A | N/A | 0.9 | 50.2 ± 1.0° C. | 62.2 ± 0.8° C. | 2.24 | 1.7 |
| | | | 9 | 59.1 ± 0.2° C. | 78.7 ± 1.7° C. | 4.96 | 1.5 |
| Membrane Distillation | Super-Hydrophobic Porous Nanoparticle | 500 nm/ 500 μm | 0.9 | 63.5 ± 0.6° C. | 70.2 ± 1.1° C. | 1.04 | 2.1 |
| | | | 2 | 73.9 ± 1.6° C. | 89.2 ± 1.2° C. | 2.72 | 1.6 |
| | | | 3 | 82.2 ± 0.8° C. | 97.8 ± 1.7° C. | 5.14 | 1.6 |
| Membrane Vapor-Permeation | Hydrophilic GO/PVA Layer | Dense layer/ 200 nm | 0.7 | 45.7 ± 0.7° C. | 62.9 ± 2.4° C. | 0.41 | 8.3 |
| | | | 2 | 63.5 ± 0.2° C. | 85.7 ± 1.7° C. | 0.81 | 4.1 |
| | Hydrophobic GO/PVA Layer | Dense layer/ 200 nm | 0.7 | 48.3 ± 0.7° C. | 64.9 ± 2.8° C. | 0.14 | 6.9 |
| | | | 2 | 69.2 ± 1.3° C. | 91.3 ± 2.5° C. | 0.40 | 6.0 | features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

What is claimed is:

1. A solar-thermal vapor-permeation membrane for separation processes, the solar-thermal vapor-permeation membrane comprising:
   a thermally conductive, porous support layer having a feed surface, the support layer being capable of absorbing solar-thermal radiation;
   a microporous active separation layer adjacent the feed surface of the support layer, the active separation layer being capable of separating one liquid component from another liquid component, wherein the active separation layer is formed of a polymer-inorganic hybrid composite, and the polymer-inorganic hybrid composite includes one or more of a polyvinyl alcohol, graphene oxide/polyvinyl alcohol (GO/PVA), a polyimide, NaA zeolites, chabazite zeolites, T-type zeolites, and hybrid silicas; and
   an intermediate layer between the feed surface of the support layer and the active separation layer, the intermediate layer having a porosity of between 5% and 20%, and the intermediate layer being formed of one of: (i) graphite nanoparticles (GNP); (ii) carbon microbeads (CM); or (iii) both (i) and (ii);
   wherein the intermediate layer is different in composition than the active separation layer, and the intermediate layer separates the support layer from the active separation layer.

2. The solar-thermal vapor-permeation membrane of claim 1, wherein the support layer is formed of one selected from a group consisting of graphite foam, nickel foam, titanium foam, aluminum foam, and a stainless-steel filter.

3. The solar-thermal vapor-permeation membrane of claim 1, wherein the active separation layer is bonded to the support layer by a phenolic resin binder.

4. The solar-thermal vapor-permeation membrane of claim 1, wherein a surface of the active separation layer is modified with a hydrophobic ligand to form a superhydrophobic functional layer.

5. The solar-thermal vapor-permeation membrane of claim 4, wherein the hydrophobic ligand is one selected from a group consisting of fatty acids, alkyl thiols, and perfluoro-silanes.

6. The solar-thermal vapor-permeation membrane of claim 1, wherein the composite is crosslinked with glutaraldehyde.

7. The solar-thermal vapor-permeation membrane of claim 1, wherein a surface of the active separation layer is modified with a hydrophobic ligand to form a superhydrophobic functional layer.

8. The solar-thermal vapor-permeation membrane of claim 7, wherein the hydrophobic ligand is one selected from a group consisting of fatty acids, alkyl thiols, and perfluoro-silanes.

9. A vapor-permeation system comprising a cell fabricated from the solar-thermal vapor-permeation membrane of claim 1, wherein the support layer forms an outer surface of the cell, the outer surface being opposite the feed surface of the support layer.

10. A vapor-permeation system comprising a tube fabricated from the solar-thermal vapor-permeation membrane of claim 1, wherein the support layer forms an outer surface of the tube, the outer surface being opposite the feed surface of the support layer.

11. A method of fabricating the solar-thermal vapor-permeation membrane for separation processes of claim 1, the method comprising the steps of:
   forming the thermally conductive, porous support layer; and
   depositing the active separation layer adjacent the feed surface of the support layer.

12. The method of claim 11, including the step of depositing the intermediate layer between the feed surface of the support layer and the active separation layer.

13. The method of claim 12, wherein the support layer is formed of graphite foam, the active separation layer is formed of a graphene oxide/polyvinyl alcohol (GO/PVA) film, and the intermediate layer is formed of one of: (i) graphite nanoparticles (GNP); (ii) carbon microbeads (CM); or (iii) both (i) and (ii).

14. The method of claim 11, including the step of modifying the active separation layer with a hydrophobic ligand.

15. A method of separating an organic component from an aqueous solution, the method comprising the steps of:
   providing a system including a structure formed of the solar-thermal vapor-permeation membrane of claim 1;
   introducing a feed solution including water and an organic component to the system;
   subjecting the system to solar-thermal irradiation;
   collecting a water vapor permeate component of the solution released through the vapor-permeation membrane structure, whereby a concentration of the organic component of the feed solution is increased; and
   obtaining the concentrated organic component from the system.

16. The method of claim 15, wherein the structure is one of (i) a cell; (ii) a barrier; or (iii) a tube.

* * * * *